United States Patent [19]
Stoltman

[11] 3,777,480
[45] Dec. 11, 1973

[54] GAS TURBINE FUEL CONTROL
[75] Inventor: Donald D. Stoltman, Henrietta, N.Y.
[73] Assignee: General Motors Corporation, Detroit, Mich.
[22] Filed: Mar. 20, 1972
[21] Appl. No.: 236,373

[52] U.S. Cl. .................... 60/39.28 R, 60/39.16 R
[51] Int. Cl. ............................................. F02c 9/10
[58] Field of Search ................................. 60/39.28

[56] References Cited
UNITED STATES PATENTS
3,213,613   10/1965   Schwent ..................... 60/39.28 R
3,230,709   1/1966    Turner ....................... 60/39.28 R
3,330,109   7/1967    Carras ........................ 60/39.28 R Primary Examiner—Clarence R. Gordon
Attorney—Paul Fitzpatrick et al.

[57] ABSTRACT

A fuel control disclosed in connection with a gas-coupled gas tubine engine for shaft power output purposes. The fuel control is supplied by a transfer pump and a pressure pump in series and delivers fuel to a nozzle in the engine combustion apparatus. The control receives an input of gas generator speed and an input of compressor discharge pressure. It receives electrical inputs serving to limit turbine inlet temperature and power turbine speed, and may include an electrical On-Off input. Flow of fuel to the engine is directly controlled by a slave valve which responds to pressure of fuel delivered to the nozzle and to a control pressure derived from the pressure pump outlet. The control pressure is developed between an upstream orifice and parallel downstream valves which include a solenoid valve operated to limit turbine inlet temperature and power turbine speed, a valve responsive to compressor discharge pressure, and a governor valve responsive to gas generator turbine speed. The On-Off control bleeds the nozzle to the fuel tank when the engine is turned off. During engine deceleration, the slave valve stops fuel flow without emptying the nozzle and the fuel line to it. The metering head across the slave valve is controlled by a differential pressure responsive by-pass valve which discharges excess fuel to the pressure pump inlet. The by-pass valve may define a passage for fuel to maintain a pilot flame during deceleration.

5 Claims, 5 Drawing Figures

PATENTED DEC 11 1973 3,777,480
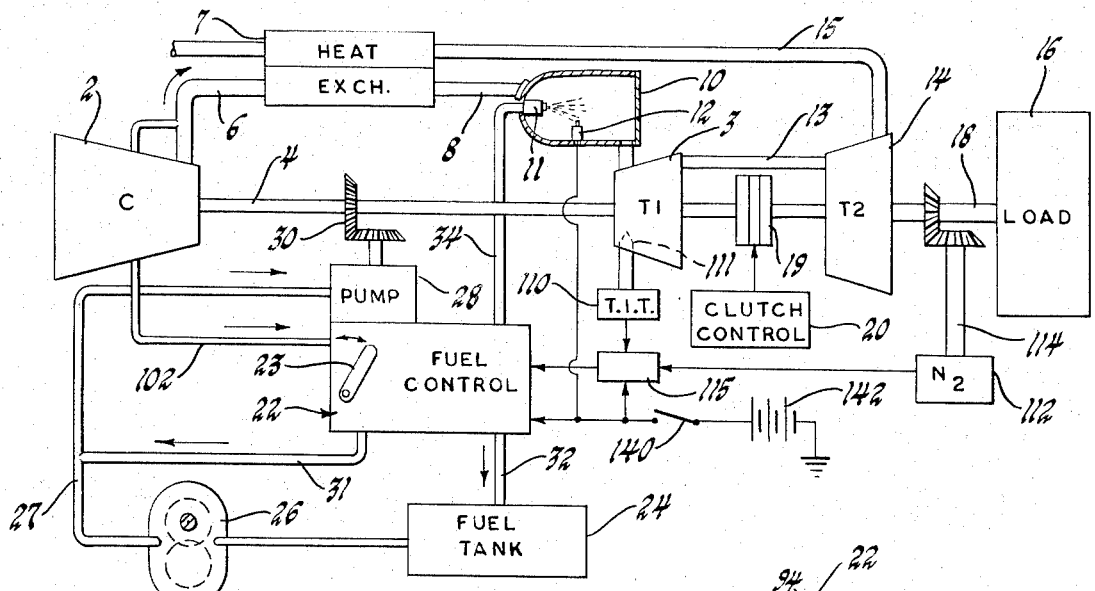
Fig. 1
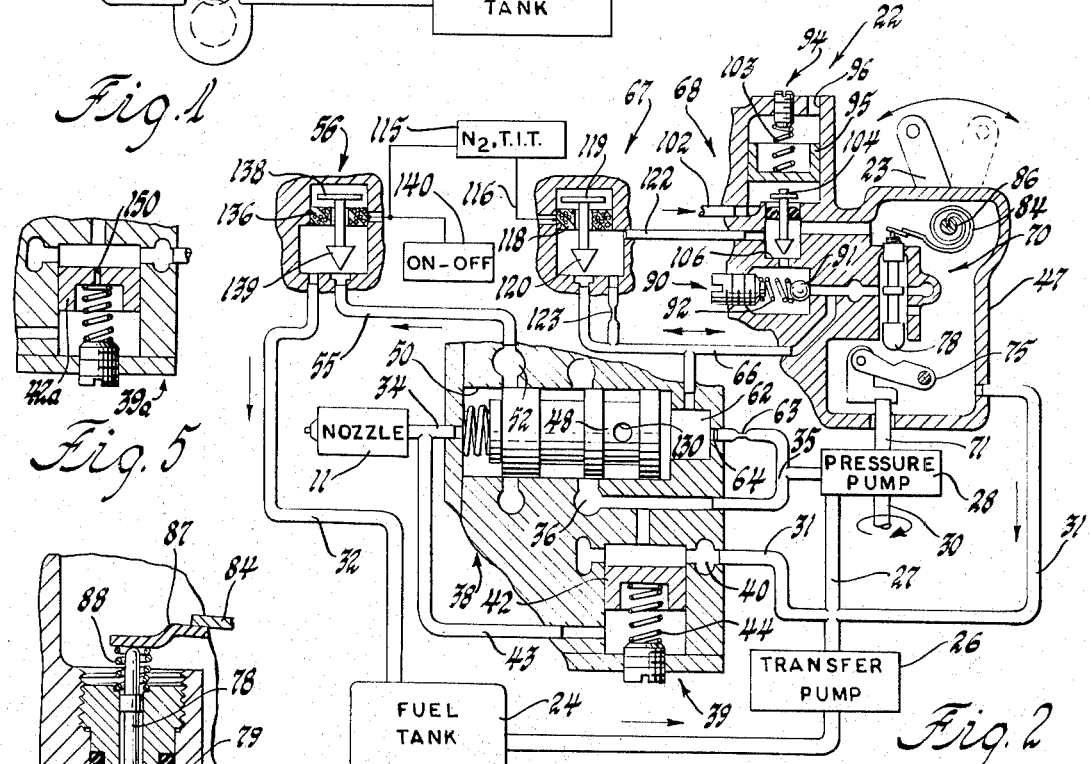
Fig. 5
Fig. 3
Fig. 2
Fig. 4

GAS TURBINE FUEL CONTROL

My invention is directed to fuel controls for gas turbine engines, particularly to a control suited to the requirements of engines of the gas-coupled type such as are used for vehicle propulsion.

The control is intended to assure safe and economical running of the engine and proper response to power demand signals. It includes an arrangement such that, during deceleration of the engine, no fuel or a minimum is supplied. Thus, fuel consumption is reduced and exhaust emissions are minimized. It includes a simple and effective arrangement of condition responsive devices which coact to control a slave valve which effects the actual control of flow of fuel to the engine. Preferably, a closed loop turbine inlet temperature control is included.

The principal objects of my invention are to provide an improved control for shaft power turbines, particularly those of a gas-coupled type. A further object is to provide a simple, effective, and responsive control which reduces fuel consumption and combustion products emission by interrupting the supply of fuel to the engine when no power output is demanded during engine deceleration.

The nature of my invention and its advantages will be clear to those skilled in the art from the succeeding detailed description of the preferred embodiment of the invention as illustrated in the accompanying drawings.

FIG. 1 is a schematic diagram of a gas turbine power plant and its fuel system.

FIG. 2 is a schematic diagram of the fuel supply and control system.

FIG. 3 is a longitudinal sectional view of a speed responsive governor valve.

FIG. 4 is a longitudinal sectional view of the fuel controlling or slave valve.

FIG. 5 is a sectional view illustrating a modification of the by-pass valve.

FIG. 1 illustrates schematically a gas turbine power plant of known type which may be structurally similar to those shown in Collman et al. U.S. Pat. No. 3,267,674 issued Aug. 23, 1966 or Bell U.S. Pat. No. 3,490,746 issued Jan. 20, 1970, for which my fuel control is particularly suited. Details of engine structure are generally immaterial to my invention. The power plant includes a compressor 2 driven by a turbine 3 through shaft 4. Atmospheric air compressed by compressor 2 is discharged through conduit 6, one pass of a heat exchanger 7, and conduit 8 into a combustion apparatus 10. Fuel is sprayed into the combustion apparatus from a nozzle 11. The fuel is ignited by an igniter 12, and the resulting combustion products drive turbine 3. The structure so far described is termed a gas generator. The gas generator delivers partly expanded combustion products through a conduit 13 to a low pressure or power turbine 14 which exhausts through conduit 15 and the other pass of heat exchanger 7 to atmosphere. Turbine 14 drives a load 16 through shafting 18. The load may be the driving wheels of a vehicle and may include any suitable change speed, neutral, and reverse transmission.

Preferably the engine includes provision for power transfer between the two turbines through a friction clutch 19, the torque capacity of which is varied by a clutch control 20. The clutch and clutch control may be of the type described in Flanigan et al U.S. Pat. No. 3,237,404 issued Mar. 1, 1966.

My invention is embodied in the engine fuel control 22 which includes a power demand input arm 23 which may be suitably connected to the usual foot pedal engine power control of a motor vehicle. Fuel is supplied from a fuel tank 24 through a transfer pump 26 and a line 27 to a pressure pump 28 which raises the fuel pressure level to a value at which it may be injected into the combustion chamber 10. Pump 28 is mechanically driven through gearing and shafting 30 from the gas generator shaft 4. The transfer pump 26 may be of any suitable type and may, for example, be driven by an electric motor powered from the vehicle battery. Pump 28 discharges directly into the fuel control 22. The system includes a by-pass line 31 from the fuel control to the pressure pump inlet and a drain line 32 from the fuel control to the fuel tank. Fuel metered by the fuel control is discharged through an engine fuel line 34 to the fuel nozzle 11.

The inputs to the fuel control from the engine will be discussed in connection with the description of FIG. 2, the schematic diagram of the fuel control, on which some items already mentioned are identified. Considering first the flow of fuel from the tank to the engine, transfer pump 26 takes fuel from tank 24 and discharges it at a few psig through line 27 into the pressure pump 28 which delivers fuel at pump outlet pressure $P_1$ through a conduit 35 into an annular space 36 defined by the fuel controlling slave valve 38. The outlet line 34 of valve 38 is connected to the fuel nozzle 11. The pressure at this point may be referred to as $P_N$ or nozzle pressure.

The control includes a by-pass valve 39 which may be of conventional type, having an inlet from the pump discharge line 35 and an outlet through annular space 40 into the by-pass line 31. The by-pass flow is controlled by a movable valve piston 42 which is biased to open by pump discharge pressure and biased to close by nozzle pressure communicated through line 43 and by an adjustable compression spring 44. Valve 39 acts to maintain a substantially constant drop through metering valve 38 and to by-pass excess discharge of pump 28 to the pump inlet. There may also be a suitable maximum pressure relief valve (not illustrated) connected between the outlet and inlet of pump 28.

The slave valve 38 (see also FIG. 4) includes a sleeve 46 mounted in housing 47 of the fuel control and a valve spool or piston 48 reciprocable in the sleeve. Sleeve 46 is mounted in a stepped bore 50 in the housing 47. The annular space 36 through which fuel enters the valve is sealed by O-rings bearing against the bottom of the bore and against a shoulder 51 on the sleeve. An annular space 52 is defined between shoulder 51 and a third O-ring bearing against the inner end of an outlet fitting 53 which retains sleeve 46 and is retained by a plate 54 fixed to the housing. Annular space 52 communicates through a passage 55 with a normally open solenoid-closed drain valve 56 which controls flow from the annulus 52 to the drain line 32 and thus to the fuel tank 24. A port 58 in fitting 53 conducts nozzle pressure to a sealed annular space 59 which is connected by the line or passage 43 of FIG. 2 to the by-pass valve 39. The slave valve 38 controls flow from the inlet at 36 to the outlet 34 to the engine or to the outlet 52 to the drain valve.

The spool 48 of the slave valve is biased to close (to the right as illustrated) by nozzle fuel pressure and by a coil spring 60 bearing against the spool and against the fitting 53. The spool is biased to open by pressure exerted on spool 48 in the chamber 62 at the inner end of stepped bore 50. The pressure thus exerted, called the control pressure $P_B$, serves to control the slave valve and determine $P_N$ and thus the flow to the engine. The control pressure is derived by flow from a branch of pressure pump outlet conduit 35 through a restriction or orifice 63 which communicates through a passage 64 with the chamber 62. Control pressure is modulated by valve means which allow flow through the orifice 63 and thus effect a variable reduction of the control pressure below the pump discharge pressure. It seems best to discuss these arrangements before continuing with details of the slave valve 38.

As shown in FIG. 2, control pressure is relieved through a line 66 having branches which communicate with a number of parallel valves each of which may bleed pressure to the pressure pump inlet. These valves are a speed and temperature limiting modulating solenoid valve 67, a compressor discharge pressure limiting valve group 68, and a governor valve 70 responsive to gas generator turbine speed.

Considering first the governor valve arrangement, this is a speed setting device for the gas generator and thus determines power output level of the engine. The shaft 30 driven by the gas generator has an extension 71 (see also FIG. 3) on which is mounted a rotary table 72 having brackets 74 on which a flyweight arm 75 is pivoted at 76. The flyweight arm, which moves upwardly as shown in FIG. 3 as speed increases and is shown in FIG. 3 in an overspeed condition, engages one end of a reciprocably mounted governor valve spool 78 having three spaced lands. Spool 78 fits within a sleeve 79 threaded into the fuel control housing 47. The sleeve 79 has a set of four radial ports 80 communicating with annular space 82 between the sleeve and housing, the ends of which are sealed by O-rings. Control pressure is supplied to the annulus 82, and the fuel may flow inwardly through ports 80 and downwardly along the valve stem and exhaust into the interior of the housing (and thus to pressure pump inlet) through a second set of radial ports 83 adjacent the lower end of sleeve 79. A bias in opposition to the force exerted by the flyweight arm 75 is provided by a spiral speed request or demand spring 84 the inner end of which is mounted on a shaft 86 rotated by the power demand input arm 23. The outer end of spring 84 engages an arm 87 rotatably mounted on shaft 86 which engages the upper end of valve spool 78 and additionally is biased upward by a light coil spring 88. Spring 88 serves to lower the governor gain (that is, increase droop) for stability. When the gas generator is below the speed called for by the setting of arm 23, the speed spring pushes the valve spool 78 downwardly to close ports 80. As speed reaches the desired level, the flyweights raise the valve stem against the speed spring, thereby opening ports 80 and bleeding control pressure, thus reducing the control pressure because of the increased drop through orifice 63.

The valve group 68 responsive to compressor discharge pressure includes a spring-biased relief valve 90 which may be of conventional structure including a ball 91 engaging a seat to block flow from the bias pressure line 66, the ball being seated by a coil spring 92 adjustably set by a threaded abutment. The relief valve 90 connects line 66 to a compressor discharge pressure responsive valve 94 which includes a slidable piston 95 mounted in a cylinder 96. The piston 95 is exposed on one face to atmospheric pressure and on the other to compressor discharge pressure which enters through a connection 102 leading from the conduit 6 of FIG. 1. Piston 95 is biased in opposition to compressor discharge pressure by an adjustable coil spring 103. Spring 103 normally presses the piston against the stem 104 of a movable valve member which cooperates with a seat 106 to block flow from the outlet of relief valve 90. The immediate result of this is that the control pressure is not affected by the valve group 68 so long as compressor discharge pressure is below the value which lifts piston 95 and allows the valve stem 104 to open the discharge from valve 90. However, when this valve is open, the valve 90 allows control pressure to drop to the value determined by the pressure setting of valve 90. Valve 104, 106 discharges to pressure pump inlet pressure within the housing 47.

The limiting valve 67 is an electromagnetically closed valve which is held closed during normal operation of the engine. It is allowed to open, however, upon occurrence of hazardous conditions; those taken care of as illustrated in this instance being excessive turbine inlet temperature (T.I.T.) or excessive speed of the power turbine ($N_2$). Other limiters which might, for example, be effective through valve 67 or a similar valve include gas generator speed and power turbine acceleration. As shown in FIG. 1, a turbine inlet temperature responsive device 110 is energized by a thermocouple or thermocouples 111 at the inlet of the gas generator turbine 3. Power turbine speed is indicated by a tachometer device 112 connected through gearing 114 to the power turbine output shaft. The devices 110 and 112 provide electrical outputs, the characteristics of which are indicative of turbine inlet temperature and power turbine speed respectively. Such a characteristic could be magnitude of voltage or current, frequency, or pulse duration per cycle, for instance. The last-named, also called "duty cycle control", is preferred. These outputs are combined in a combining circuit 115 which, by suitable electrical devices, provides a signal through electrical conduit 116 to a solenoid 118 of the valve 67. Normally, current in solenoid 118 attracts an armature 119 to hold movable valve member 120 against the seat and thus close off an outlet from control pressure to the pressure pump inlet.

If valve member 120 modulates a leakage flow, it allows control pressure to bleed through the connection indicated schematically at 122 to pressure pump inlet. The degree to which the valve opens to reduce control pressure is determined by the level of energization of the solenoid 118.

To calibrate the maximum $P_N$ pressure of the control, there is also provided a constant bleed of bias pressure through a small orifice 123 in parallel with the valves 67, 68, and 70.

It should be understood that the showing of the limiting valve 67 is of a schematic nature and that the actual structure will follow good practice in the art. Such solenoid controlled valves are available. In general, the force exerted by the valve stem against the pressure in the conduit leading to the valve is proportional to the average current flowing through the solenoid. As to the devices 110 and 112 responding to the conditions to be limited and the combining circuit 115, the details of these are immaterial to my invention. Electric tachometers and electric temperature indicating devices are well known, and the sole function of the combining circuit 115 is to respond to the inputs an provide an output which reduces the power fed to the solenoid, either as a matter of current level or of pulse length as may be desired, so that the pressure threshold of valve 67 decreases sharply as TIT or $N_2$ rises to the desired limit. Thus valve 67 is effective to reduce control pressure progressively as the limit conditions are approached and to bleed control pressure down to a low value at the limit point of either of the limited parameters to the extent, if necessary, of shutting off fuel to prevent damage to the engine. Also, an $N_2$ limit may serve as a vehicle speed limiter.

As has been previously stated, the pressure of fuel supplied to the nozzle 11 by the slave valve 38 is determined by the control pressure. Thus, as control pressure is lowered by opening any of the valves 67, 68, or 70, flow to the fuel nozzle is decreased. The power output of the gas generator is accordingly diminished and overspeed, overtemperature, or overpressure conditions are corrected, as will be understood by those skilled in the art.

It is now in order to consider specifically the structure of the slave valve 38. As previously noted, the valve includes a spool or piston 48 which is closed at the inner end, against which the bias pressure is exerted through the connection 64 (FIG. 4). The interior of the spool is hollow, and the interior bore is stepped to provide a seat for the coil spring 60 which urges the valve spool to the right toward the fuel cutoff position illustrated in FIG. 4. Radial ports 130 through the valve spool connect the interior of the spool with the circumferential groove 131 near the head of the spool. In the shutoff position of the valve, groove 131 is out of register with two opposed fuel metering ports 132 (not shown in true angular relation to each other) extending through the sleeve 46. These ports are of triangular form with the apex to the right as illustrated in FIG. 4 so that, as the valve spool moves to the left the passage through ports 132 is very gradually opened and is more rapidly opened as the valve spool moves farther to the left or in the fuel supply direction. When groove 131 registers with ports 132, fuel may flow through ports 130 and the hollow interior of the valve spool and on to the outlet 34.

There are also two radial ports 134 through the sleeve 46 which communicate with the space 52. Flow from the outlet 34 through the fitting 53 and ports 134 into space 52 is possible when the piston 48 approaches its right hand limit of travel as illustrated. This is permitted by a reduced diameter portion 135 at the extreme left end of the spool. Annular space 52 communicates, as previously stated, with passage 55 and a drain valve 56 which allows the fuel to be discharged to the fuel tank 24 at atmospheric pressure. If valve 56 is open, therefore, as when the engine is turned off, and the bias pressure is reduced, the nozzle 11 and line 34 will be drained back to the fuel tank, due to the residual compressor discharge pressure.

In normal operation of the engine, however, it is not desired to drain the fuel line but rather to interrupt or substantially shut off flow of fuel to the nozzle when power output is temporarily halted by a power reducing movement of input arm 23. Therefore, the drain valve 56 is a solenoid-operated valve generally similar to the valve 67 just described. It includes a solenoid 136 which, by attracting an armature 138, holds a valve plunger 139 against a seat, closing the outlet from line 55. This valve is held closed by current supplied through an On-Off switch 140 from a battery 142. For the engine to operate, the switch is closed; and to shut down the engine, the switch is opened, deenergizing both solenoid valves 56 and 67. Switch 140 also energizes the igniter 12 which serves to ignite the fuel in the combustion apparatus, and it may have other functions in connection with starting the engine, for example. The igniter is operated continuously with this fuel system because the fuel is shut off when no power output is desired from the gas generator. My invention is not particularly concerned with cranking the engine, which may be cranked by any suitable starting motor geared to the gas generator; however, the control will monitor T.I.T. and request idle speed throughout the start.

OPERATION

We will first discuss operation of the fuel control during normal operation of the engine over the range from idle to full power. The transfer pump supplies fuel at a low pressure such as 2 to 6 psig to the pressure pump 28 which delivers fuel through conduit 35, slave valve 38, and conduit 34 to the fuel nozzle 11. Pump 28 may have a maximum discharge pressure of 300 to 400 psig. Valve 38 is a throttling valve, and pump discharge in excess of that required is returned to the pressure pump inlet by valve 39, which also maintains a nearly constant pressure drop across the slave valve. In normal operation, the switch 140 is closed and solenoid valve 56 therefore is closed to prevent draining the nozzle even though the slave valve is moved to the cutoff position. The position of the slave valve is determined by the action of the control pressure on one end of the valve and of nozzle pressure on the other plus the small force due to coil spring 60. Thus, the nozzle pressure is less than the bias pressure by the quantity which is the force of spring 60 divided by the area of the valve piston 48. This is desirable during starting, when it is desired to have nozzle pressure equal 0 gauge, or if a value lower than transfer pump pressure must be scheduled if overtemperature occurs. The pressure pump discharge pressure is greater than the nozzle pressure by the amount of drop determined by the force of spring 44 of the by-pass valve. Pump pressure thus adjusts as necessary to provide the desired nozzle pressure and avoid overloading of the pump. Fuel flow through the nozzle, of course, is determined by the pressure of the fuel supplied to the nozzle and by the pressure against which it discharges. With a constant-area nozzle, it is proportional to the square root of the difference between nozzle pressure and air pressure within the combustion apparatus 10, which is very nearly compressor discharge pressure. When the valve spool 48 is fully moved to the right, the fuel is shut off. As it begins to move to the left as illustrated so that the apex of each triangular port 132 begins to register with groove 131 of the valve piston, flow through the slave valve begins and the rate of flow increases generally proportionally to the exposed area of the ports as the piston continues to move to the left, since metering head is nearly constant. Because of the rate of compression spring 60, the actual difference between bias pressure and nozzle pressure and the position of the valve spool are essentially linear functions of each other. Because of the triangular shape of ports 132, the area for fuel flow through them is approximately proportional to the square of spool displacement from a datum point. This permits sensitive metering at low flows over a wide range of fuel flow.

As previously stated, the position of the metering valve spool depends upon the difference between control pressure and nozzle pressure. This difference, of course, is a function of the flow through orifice 63, which depends upon the flow through orifice 123 and the opening of the several controlling valves 67, 68, and 70. Opening to any extent of any of these valves increases flow and thereby reduces control pressure to reduce flow to the engine. With all the valves closed, the maximum flow of which the system is capable will be supplied to the engine.

At all times some fuel is bled through orifice 123 to produce a certain minimum pressure drop through orifice 63, this drop varying with the level of pressure pump outlet pressure, but the drops through the two orifices being proportional. Normal control of the control pressure to govern flow of fuel to the engine is accomplished by the governor valve 70, the valve 67 and valve group 68 being in the nature of overrides or limiters. With the governor valve in the position shown in FIG. 3, the ports 80 are fully opened for bleed of bias pressure through the valve sleeve and out the ports 83. This bleed is sufficient under all circumstances to reduce nozzle pressure to the level of compressor discharge pressure and thus the engine to a condition of fuel cutoff if the governor valve is completely open. In normal constant speed operation, the governor valve is partly open with some flow through ports 80, the position of the valve being determined by the force exerted by the flyweight arm 75 and the force exerted by spring 84 set by the power demand input control 23. If the engine should overspeed, the flyweights further open the ports 80 to reduce control pressure and therefore fuel flow to the engine. If for any reason the gas generator speed drops below the governor speed setting, ports 80 will be partially closed by reduction of the force of the flyweight and therefore bias pressure will increase and open the metering valve to supply more fuel. Movement of arm 23 to increase or decrease engine power output results in an underspeed or overspeed signal until the gas generator speed stabilizes at the new setting. A sharp cutback in throttle setting, as for example to idle setting, creates an immediate substantial overspeed signal in the governor, to shut-off fuel flow until the gas generator decelerates to idle speed.

The valve group 68 is provided as a limiter of air flow through limitation of compressor discharge pressure. This serves as a means to permit full power output of the gas generator without overloading at low altitudes and low ambient temperatures. If compressor discharge pressure exerted on piston 95 exceeds the resistance from spring 103, the piston rises, allowing control pressure to bleed through resistance valve 90 to transfer pump outlet pressure. The relief valve 90 sets the minimum value to which control pressure is reduced when valve 94 opens. Upon reduction of fuel, the gas generator slows down, and CDP is reduced. Valve 94 may operate in a floating manner with controlled leakage through the valve to limit CDP to the established maximum value.

The limiting valve 67 is an electrically operated limiter which, in the system shown, is responsive to turbine inlet temperature and to power turbine speed. If either of these approaches the predetermined limit, electrical power fed to solenoid 118 is reduced and therefore the restriction of the solenoid valve to control pressure is reduced.

There is a steep reduction in control pressure beginning just before either of the controlling parameters reaches its maximum value, so that the engine may be governed at maximum turbine inlet temperature, or power is reduced to prevent overspeed of the power turbine in the event the load is insufficient for any reason.

Instead of having a single solenoid valve controlled by a plurality of limiting parameters through the combining circuit 115, as many solenoid operated limiting valves as may be desired may be connected in parallel, with each limiting valve responsive to some particular input representing approach of an operating parameter to its limit.

Thus it will be seen that the gas output of the gas generator, which responds to the quantity of fuel fed to it, is determined basically by the operator-controlled setting of the arm 23 subject to override if certain conditions reach predetermined maxima. If the power control input 23 is returned to the idle position, the coil spring 88 in the governor valve opens the valve to vent control pressure sufficiently to cause the slave valve to close. The slave valve is designed to be essentially leak-proof, as is also the head regulating valve, so that the fuel is retained in the line 34 and nozzle 11 with no significant inflow to cause drip or backflow to empty the nozzle. Since the ignition remains energized, the vehicle operator, by depressing the foot pedal, may cause immediate resumption of fuel flow through the nozzle and resumption of combustion.

The temperature limit may be lowered by suitable controls for starting the engine. Starting may take place simply by closing switch 140 and holding the power input at the idle position to cause the governor valve to remain closed until the engine, upon being cranked and upon fuel reaching the combustion chamber, lights off and accelerates to idle speed. Safety or sequencing controls of the cranking operation are not a part of this invention and will not be described herein. Also, we are not concerned here with control of power transfer clutch 19 to serve the purposes described in the above-mentioned Flanigan et al. patent.

If it is desired to shut down the engine rather than temporarily interrupt the discharge of power from the engine, the switch 140 is opened, opening the solenoid valves 56 and 67 to bleed the nozzle and stop fuel supply, and deenergize the igniter 12.

FIG. 5 illustrates a modification of the system which might be desirable in some installations. The by-pass valve is modified to provide a small constant minimum fuel flow during deceleration instead of complete fuel cutoff. This may be desired to keep a pilot burner ignited rather than keeping an igniter such as 12 energized.

The by-pass valve 39a shown in FIG. 5 is modified by provision of a small orifice 150 through the head of the valve piston 42a. Since there is a constant pressure drop across this piston due to the force of spring 44, there will be a constant flow through the by-pass valve to the line 34 unless dumped, as by deenergizing valve 56.

It will be apparent to those skilled in the art from the foregoing detailed description that I have provided a fuel control of simple but complete nature, particularly adapted to meet the requirements of supplying fuel to a gas turbine, especially those employed in such environments as supplying the driving power to motor vehicles.

The detailed description of the preferred embodiment of the invention for the purpose of explaining the principles thereof is not to be considered as limiting or restricting the invention, since many modifications may be made by the exercise of skill in the art.

I claim:

1. A fuel supply system for a gas turbine engine comprising, in combination, a pressure pump and fuel control means connected between the pressure pump and the engine fuel line, the fuel control means including a fuel controlling valve supplied by the pressure pump, the fuel controlling valve including closing means biased to close the valve by engine fuel pressure and opening means biased to open the valve by a control pressure, the fuel controlling valve having a closed condition blocking flow to the engine; means for generating the control pressure including a conduit connected for flow from the pump in series through an orifice, an intermediate conduit section, and controllable valve means downstream of the intermediate conduit section, the intermediate conduit section being connected to the said opening means so that the fuel controlling valve responds to the condition of the controllable valve means; the said controllable valve means being connected in parallel and including a variably settable governor valve responsive to speed of an engine component indicative of engine power level and a limiting valve effective to limit a condition of engine operation; the said controllable valve means being connected to discharge to the pressure pump inlet; and means effective to maintain a controlled pressure drop across the fuel controlling valve.

2. A fuel supply system for a gas turbine engine comprising, in combination, a pressure pump and fuel control means connected between the pressure pump and the engine fuel line, the fuel control means including a fuel controlling valve supplied by the pressure pump, the fuel controlling valve including closing means biased to close the valve by engine fuel pressure and opening means biased to open the valve by a control pressure, the fuel controlling valve having a closed condition blocking flow to the engine; means for generating the control pressure including a conduit connected for flow from the pump in series through an orifice, an intermediate conduit section, and controllable valve means downstream of the intermediate conduit section, the intermediate conduit section being connected to the said opening means so that the fuel controlling valve responds to the condition of the controllable valve means; the said controllable valve means being connected in parallel and including a variably settable governor valve responsive to speed of an engine component indicative of engine power level and a limiting valve effective to limit a condition of engine operation; the said controllable valve means being connected to discharge to the pressure pump inlet; means effective to maintain a controlled pressure drop across the fuel controlling valve; and optionally operable means effective to bleed the engine fuel line to the fuel tank only when the fuel controlling valve is in closed condition.

3. A fuel supply system for a gas turbine engine comprising, in combination, a pressure pump and fuel control means connected between the pressure pump and the engine fuel line, the fuel control means including a fuel controlling valve supplied by the pressure pump, the fuel controlling valve including closing means biased to close the valve by engine fuel pressure and opening means biased to open the valve by a control pressure, the fuel controlling valve having a closed condition blocking flow to the engine; means for generating the control pressure including a conduit connected for flow from the pump in series through an orifice, an intermediate conduit section, and controllable valve means downstream of the intermediate conduit section, the intermediate conduit section being connected to the said opening means so that the fuel controlling valve responds to the condition of the controllable valve means; the said controllable valve means being connected in parallel and including a variably settable governor valve responsive to speed of an engine component indicative of engine power level, a limiting valve effective to limit a condition of engine operation, and a pressure limiting valve group, the pressure limiting valve group comprising a relief valve and a valve opened at a predetermined compressor discharge pressure, the valves of the said group being connected in series; the said controllable valve means being connected to discharge to the pressure pump inlet; and means effective to maintain a controlled pressure drop across the fuel controlling valve.

4. A fuel supply system for a gas turbine engine comprising, in combination, a fuel tank, a transfer pump supplied by the tank, a pressure pump supplied by the transfer pump, and fuel control means connected between the pressure pump and the engine fuel line, the fuel control means including a fuel controlling valve supplied by the pressure pump, the fuel controlling valve including closing means biased to close the valve by engine fuel pressure and opening means biased to open the valve by a control pressure, the fuel controlling valve having a closed condition blocking flow to the engine; means for generating the control pressure including a conduit connected for flow from the pressure pump in series through an orifice, an intermediate conduit section, and controllable valve means downstream of the intermediate conduit section, the intermediate conduit section being connected to the said opening means so that the fuel controlling valve responds to the condition of the controllable valve means; the said controllable valve means being connected in parallel and including a variably settable governor valve responsive to speed of an engine component indicative of engine power level, a limiting valve effective to limit a condition of engine operation, and a pressure limiting valve group, the pressure limiting valve group comprising a relief valve and a valve opened at a predetermined compressor discharge pressure, the valves of the said group being connected in series; the said controllable valve means being connected to discharge to the pressure pump inlet; a metering head regulating by-pass valve connected between the pressure pump outlet and inlet effective to maintain a controlled pressure drop across the fuel controlling valve; and optionally operable means effective to bleed the engine fuel line to the fuel tank only when the fuel controlling valve is in closed condition.

5. A fuel supply system for a gas turbine engine comprising, in combination, a pressure pump and fuel control means connected between the pressure pump and the engine fuel line, the fuel control means including a fuel controlling valve supplied by the pressure pump, the fuel controlling valve including closing means biased to close the valve by engine fuel pressure and opening means biased to open the valve by a control pressure, the fuel controlling valve having a closed condition blocking flow to the engine; means for generating the control pressure including a conduit connected for flow from the pump in series through an orifice, an intermediate conduit section, and controllable valve means downstream of the intermediate conduit section, the intermediate conduit section being connected to the said opening means so that the fuel controlling valve responds to the condition of the controllable valve means; the said controllable valve means being connected in parallel and including a variably settable governor valve responsive to speed of an engine component indicative of engine power level and a limiting valve effective to limit a condition of engine operation; the said controllable valve means being connected to discharge to the pressure pump inlet; and means effective to maintain a controlled pressure drop across the fuel controlling valve, the last-named means being a bypass valve including a valve cylinder, a valve piston in the cylinder subjected to the fuel pressures at inlet and outlet to the fuel controlling valve exerted on opposed faces of the piston, means biasing the piston to maintain a predetermined differential between the said pressures; and means defining an orifice through the piston for flow of fuel at a predetermined minimum rate to the engine fuel line.

* * * * *